United States Patent Office 3,450,715
Patented June 17, 1969

3,450,715
N-HYDROCARBON SUCCINIMIDYL POLYMERS
Eddie G. Lindstrom, Martinez, and Enver Mehmedbasich, El Cerrito, Calif., assignors to Chevron Research Company, San Francisco, Calif., a corporation of Delaware
No Drawing. Original application Apr. 9, 1965, Ser. No. 447,096, now Patent No. 3,379,515, dated Apr. 23, 1968. Divided and this application Dec. 8, 1967, Ser. No. 706,736
Int. Cl. C10l 1/08, 1/10
U.S. Cl. 260—326.3          6 Claims

ABSTRACT OF THE DISCLOSURE

Fuel detergents comprising succinimidyl substituted high molecular weight hydrocarbon polymers wherein the nitrogen substituent is a hydrocarbon group and the equivalent weight per succinimidyl group is from about 3,000 to 10,000.

CROSS-REFERENCE TO RELATED APPLICATIONS

This application is a divisional of application Ser. No. 447,096, filed on Apr. 9, 1965, issued as U.S. Patent No. 3,379,515.

This invention concerns novel fuel oil additives and fuel oil compositions derived therefrom. More particularly, this invention concerns novel succinimide substituted polyolefins which find use as fuel oil additives and the fuel oil compositions containing them.

Fuels are susceptible to chemical reaction on aging. The effect of oxidation is to produce soluble and insoluble materials of higher molecular weight and boiling point than the original fuel. The deterioration due to oxidation and the like in distillate fuels, particularly in diesel fuels, manifests itself, for example, through the appearance of color and gums. The tacky, oxidized fuel deposits adhere readily to injector parts and can cause injector sticking, nozzle hole plugging and leakage past critical surfaces. The color is objectionable to customers.

Also, diesel engines are equipped with fuel filters to remove particulate matter from the fuel. Any gums which are present in the fuel tend to coat on to the filter requiring frequent changes of the filter in order to permit adequate fuel flow, as well as effective filtering action.

While many materials might effectively act as commercially successful dispersants for the gum, the field is severely limited to a relatively few materials. For, since the dispersant is an additive to the fuel, it must not significantly increase the deposits created in the combustion chamber, which would interfere with the proper functioning of the piston. In order to have an acceptable fuel dispersant, it is not only necessary that the dispersant maintain the gums dispersed in the fuel mixture, but the dispersant itself, when introduced into the combustion chamber should not form deposits which significantly interfere with the operation of the piston.

Pursuant to this invention, succinimide substituted polymers of α-olefins having an average number of carbon atoms in the range of 6 to 18 carbon atoms and of at least 100,000 molecular weight are provided, wherein the substituent on the nitrogen has not more than 22 carbon atoms. These materials find use as dispersants and detergents in various fuels.

The polymeric dispersant will have at least about 100,000 molecular weight and will generally not exceed 1,000,000 molecular weight ($1 \times 10^{5-6}$); preferably, the molecular weight will be in the range of about 150,000 to 500,000. The equivalent weight, that weight determined by dividing the total molecular weight by the total number of succinimide groups present per molecule, will be in the range from about 3,000 to 10,000, preferably in the range from about 4,000 to 8,000.

The substituent on the succinimide nitrogen will be hydrogen or a hydrocarbon radical of from 1 to 22 carbon atoms, more usually of from 6 to 18 carbon atoms. While one or more different substituents on the succinimide nitrogens may be present, generally not more than two different amines will be used to prepare the succinimide, and more usually only a single amine will be used.

Alternatively, the polymer may be described by a recurring unit of the following formula I.  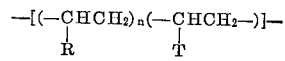

wherein R is hydrogen or an alkyl group of from 1 to 20 carbon atoms, more usually an alkyl group of from 4 to 18 carbon atoms, desirably of from 6 to 18 carbon atoms, and T is a succinimidyl substituted alkenyl radical. That is, olefins from ethylene to docosene may be used, but the average number of carbon atoms is in the range of 8 to 18 carbon atoms. Preferably, olefins in the range of 8 to 20 carbon atoms will be used. n will depend on the average number of carbon atoms in R and the desired equivalent weight, being an integer, generally varying in the range of 10 to 100, more usually from 15 to 80.

T can be further defined by the following formula

II.  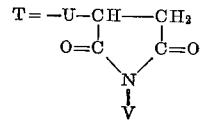

wherein U is an alkenylene radical (a divalent aliphatic radical having a single site of unsaturation) usually of from 4 to 18 carbon atoms and V is hydrogen or an organic hydrocarbon radical of from 1 to 22 carbon atoms, preferably a hydrocarbon radical of from 6 to 18 carbon atoms.

The formula for the recurring unit, by combining Formulae I and II is

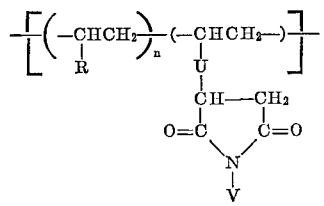

where the symbols have their previously defined meaning.

The compositions of this invention can be readily prepared by copolymerizing α-olefins of at least 2 carbon atoms and not more than 22 carbon atoms with nonconjugated diolefins of at least 6 carbon atoms and not more than 20 carbon atoms, generally of from 8 to 18 carbon atoms, adducting maleic anhydride to the aliphatic unsaturation still present in the copolymer and reacting the maleic anhydride adducted olefin copolymer with an amine under conditions which predominantly form the imide. As indicated, olefins of from 2 to 22 carbon atoms can be used, but preferably the olefins will be of at least 6 carbon atoms and more usually in the range of 8 to 20 carbon atoms.

Illustrative of α-olefins or 1-olefins which find use are ethylene, propylene, butylene, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, and docosene-1.

The diolefins which find use may have both olefins terminally situated or only one olefin group in the terminal position. Illustrative of various diolefins are 1,7-octadiene, 1,9-decadiene, 1,11-dodecadiene, 1,15-hexadecadiene, 1,11-hexadecadiene, 1,10-dodecadiene, etc.

The olefins are most conveniently polymerized with "Ziegler-type" catalysts. These catalysts generally include a transition metal compound such as the halide, oxide or alkoxide and an organometallic compound with a metal of Groups I–III of the Periodic Chart. Most conveniently, titanium tri- or tetrachloride or vanadium trichloride or oxychloride is combined with a trialkyl aluminum or dialkyl aluminum halide such as triethyl aluminum, triisobutyl aluminum or diethyl aluminum chloride. These "Ziegler-type" catalysts are well known in the art and do not require extensive exemplification here. See for example "Stereospecific Catalysis" beginning at page 93 in the journal, "Chemical Engineering" for Apr. 2, 1962 (McGraw-Hill Publishing Company, New York).

The copolymerization is conveniently carried out at temperatures from about 30° C. to about 150° C. at atmospheric pressure. The lower temperatures give copolymers of higher molecular weight. An inert hydrocarbon diluent, such as toluene, xylene, petroleum naphtha or mineral lubricating oil is commonly employed. The reaction time is ordinarily from about 0.5 to 10 hours. When the polymerization is completed, the reaction is stopped by quenching with an alcohol, thus deactivating the catalyst, and precipitating the copolymer product from the inert hydrocarbon diluent.

In the present invention, the preferred copolymers are derived from cracked wax olefin mixtures of (A) α-olefins of from about 6 to about 22 carbon atoms and (B) diolefins of from about 6 to about 20 carbon atoms. Such cracked wax olefin copolymers are described in copending application Ser. No. 248,212, filed Dec. 31, 1952, now abandoned.

The cracked wax olefin mixtures are suitably prepared by thermocracking of conventional refined paraffin waxes derived from typical waxy crude oils. While about 90% by weight of the wax is normal paraffins, the balance of the wax composition is made up of isoparaffins, naphthenes and small proportions of aromatic hydrocarbons. The wax is cracked at temperatures of about 500° to about 600° C. with exposure times of only a few seconds. The resulting distribution of olefins may then be distilled to separate into various fractions. For further description of the process, see U.S. Patent No. 2,172,228.

The analysis of a typical cracked wax olefin mixture indicates the following distribution of products:

TABLE I

| | Weight percent |
|---|---|
| Straight-chain α-olefins | 89 |
| Straight-chain α,ω-diolefins | 5 |
| Straight-chain α-internal olefins | 1 |
| Branched-chain and naphthenic hydrocarbons | 3 |
| Conjugated internal diolefins, etc. | 2 |

In the adduction reaction, the maleic anhydride adds to the unsaturated hydrocarbon groups which are generally pendant from the polymer backbone to give succinic anhydride groups. The temperatures of the adduction are ordinarily between about 100° and 300° C., more usually between 150° and 250° C. The copolymer and maleic anhydride are heated together until the adduction is essentially complete as indicated by no further consumption of maleic anhydride. Usually from about 4 to 24 hours is sufficient.

If desired, the adduction may be carried out by other techniques, for example, by reaction of a chlorinated polymer containing about 1 weight percent chloride with maleic anhydride. Residual chlorine or other nonhydrocarbon substituent does not alter the essentially hydrocarbon character of the polymers needed for oil solubility.

The resulting maleic anhydride adducted copolymer may then be reacted with the desired amine or amines at temperatures in the range of about 100° to 150° C. Usually at least one equivalent of amine will be used per maleic anhydride present. Frequently, an excess of from 2 to 5 equivalents of amine per maleic anhydride will be used. The reaction can be followed by removal of the water of reaction as it is formed, or other convenient means, e.g., spectroscopy. When an amount of water equivalent to the number of maleic anhydride groups present has been formed, the reaction may be stopped. Generally from 2 to 24 hours will suffice for completion of the reaction.

To facilitate the removal of water of reaction, an inert diluent is generally used. Useful diluents are aromatic hydrocarbons which will boil in the range of about 75° to 150° C.

As already indicated, the amines which find use are ammonia or hydrocarbon monoamines of from 1 to 22 carbon atoms having one primary amino group which may be aliphatic-alkyl or alkenyl-alicyclic, aryl, aralkyl, alkaryl, alkaralkyl, etc. That is, any type of hydrocarbon radical.

With amines which have an aromatic group, such as aryl-, alkaryl- and aralkylamines, the aryl group may have di(lower alkyl)amino substituents or lower alkoxy substituents bonded to an annular aryl carbon atom. Rarely will there be more than one of these groups present per primary amino group. These substituted aryl containing moieties are of from 7 to 22 carbon atoms. Illustrative of such amines are p-N,N-dimethylaminoaniline, p-methoxyaniline, p-ethoxybenzylamine, p-N,N-dimethylamino-m-toluidine, etc.

Illustrative of aliphatic amines are methylamine, ethylamine, propylamine, isobutylamine, hexylamine, heptylamine, nonylamine, decylamine, dodecylamine, tetradecylamine, octadecylamine, eicosylamine, dodecenylamine, hexenylamine hexadecenylamine, octadecenylamine, octadecadienylamine, tall oil fatty amines, tallow amines, etc.

Illustrative of alicyclic amines are cyclopentylamine, cyclohexylamine, methylcyclohexylamine, tert.-butylcyclohexylamine, cycloheptylamine, cyclooctylamine, camphylamine, etc.

Illustrative of aryl and alkaryl amines are aniline, toluidine, 2,4-xylylamine, 2,6-xylylamine, 2,6-diethylaniline, 4-ethylaniline, 4-tert.-butylaniline naphthylamine, hexylaniline, propylaniline, etc. Preferably, the aromatic amines will be monocyclic and of from 6 to 12 carbon atoms.

Illustrative of the aralkyl hydrocarbon amines are benzylamine, 2-3-4-methylbenzylamine, 2 - 3 - 4 - ethylbenzylamine, 2,4 - dimethylbenzylamine, 2,6 - dimethylbenzylamine, 2,6-diethylbenzylamine, β-phenethylamine, etc. The preferred aralkyl amines are those having only a single methylene group between the nitrogen and the phenyl.

The following examples are offered by way of illustration and not by way of limitation.

Example A.—Exemplary "Ziegler-type" polymerization

In this example, a "Ziegler-type" high molecular weight unsaturated polymer is synthesized from a typical mixture of cracked wax olefins of about 10 to 20 carbon atoms containing about 90% by weight straight-chain α-olefins and about 6% by weight diolefins.

A co-catalyst mixture is prepared by introducing 75 ml. of dry heptane into a 2-liter flask fitted with condenser and stirrer. Into the flask under nitrogen is then added 7.5 g. of titanium trichloride AA (aluminum activated) followed by the addition of 9.35 g. of triisobutyl aluminum in 75 ml. of dry heptane.

Into the catalyst mixture is added dry xylene under nitrogen and the mixture heated to reflux. To the refluxing catalyst suspension is added 200 g. of cracked wax olefins containing from 10 to 20 carbon atoms. External heat is removed until the temperature increase due to the polymerization of the reaction subsides, followed by heating again to reflux. After 45 minutes of reflux, external heat is removed and upon the temperature dropping to 100° C., isopropyl alcohol is added until no further violent reaction occurs. The subsequent addition of gross amounts of methanol precipitates the polymer. The supernatant liquid is discarded, and the polymer is first washed with methanol and then with acetone. After three subsequent precipitations from benzene solution with acetone, the polymer is dissolved in benzene. Yield=89%.

Example B.—Adduction of maleic anhydride to cracked wax olefin polymer

Into a flask is introduced 60 g. of cracked wax olefin copolymer prepared in Example A, 120 g. of cetane, 25 g. of maleic anhydride, and 2 g. of bis(dibutylhydroxyphenyl)methane and the mixture heated for 24 hours at about 210° C. in a nitrogen atmosphere. At the end of this time, the adduct is precipitated with dry acetone and redissolved in benzene, repeating this operation three times. The last benzene solution is filtered over activated clay. The equivalent weight based on succinic anhydride groups is found to be approximately 6000. The molecular weight of the adduct is about 300,000.

Example C

In this example, the equipment and general procedure are the same as in Example A. Into the reaction flask is charged 200 g. of a cracked wax olefin mixture and 5 g. of phenyl-β-naphthylamine. The cracked wax olefin mixture consists approximately of 30% $C_{9-11}$, 40% $C_{11-15}$ and 30% $C_{15-20}$ olefins.

TABLE IA.—MOLE PERCENT

| | $C_{9-11}$ | $C_{11-15}$ | $C_{15-21}$ |
|---|---|---|---|
| $C_8$ | 1 | | |
| $C_9$ | 22 | | |
| $C_{10}$ | 55 | 1 | |
| $C_{11}$ | 21 | 13 | |
| $C_{12}$ | 1 | 24 | |
| $C_{13}$ | | 24 | |
| $C_{14}$ | | 24 | 1 |
| $C_{15}$ | | 13 | 12 |
| $C_{16}$ | | 1 | 19 |
| $C_{17}$ | | | 18 |
| $C_{18}$ | | | 18 |
| $C_{19}$ | | | 17 |
| $C_{20}$ | | | 14 |
| $C_{21}$ | | | 1 |

The charge is heated to about 100° C. and the equipment and charge are purged with nitrogen to remove oxygen.

The co-catalyst mixture consists of 4.5 g. of the titanium trichloride AA in 50 ml. of xylene and 2.9 ml. of ethyl aluminum dichloride in 50 ml. of xylene, which are added to the reaction flask. The rate of addition of co-catalysts was controlled to maintain the reaction temperature at about 100° to 110° C. External cooling may be required in order to maintain this temperature.

After about 3 hours, the evolution of heat ceases and the reaction is stopped. To the mixture, 40 ml. of ethanolamine is added and the mixture stirred for about 30 minutes. The polymeric product is then precipitated wtih methanol, dissolved in benzene and azeotroped free of methanol.

Example 1

Into a 500 ml., 3-neck flask was introduced 78 g. (0.02 equiv.) of a polymer prepared as described in Example C, and adducted according to Example B, 4.0 g. (0.04 mole) of cyclohexylamine and 312 g. of xylene. The mixture was stirred at 125° C. for 6 hours at which time approximately one equivalent of water had collected in a Dean-Stark trap. The reaction product was precipitated with acetone and washed with methanol. The yield was 65 g. (82%). The infrared spectrum of the product was characterized by the succinimide bands at 1710 cm.$^{-1}$ and 1780 cm.$^{-1}$.

Example 2

Into a 500 ml. flask equipped with a water trap was added 78 g. (0.02 equiv.) of a polymer prepared as described in Example 1, 4.3 g. (0.04 mole) of benzylamine, 312 g. of 150 Neutral oil and 312 g. of xylene. The mixture was stirred at a temperature of 180° C. for 6 hours at which time approximately one equivalent of water had collected in the trap. The reaction product was precipitated with acetone and washed with methanol. The yield was 68 g. (85%). The infrared spectrum of the N-benzyl succinimide of the copolymer was characterized by bands at 1710 cm.$^{-1}$ and 1780 cm.$^{-1}$.

The additive of this invention may be used with various hydrocarbon distillate fuels, particularly the higher boiling range fuels. These fuels include: the aircraft gas turbine engine fuels, commonly referred to as the "jet fuels"; kerosenes, gas oils, and particularly the thermal and catalytically cracked gas oils; compression-ignition, internal combustion fuels, such as diesel fuels; and the conventional burner or furnace oils.

The amount of dispersant will vary depending on the fuel and particularly dispersant. Usually, the amount of dispersant providing good sludge and gum control will be in the range of 0.0001 to 1.0 weight percent, more usually 0.0005 to 0.5 weight percent of the fuel composition. However, the dispersants can be conveniently prepared as concentrates, being diluted prior to use. As concentrates, the amount of dispersant will usually vary from about 10 to 70 weight percent of the total composition.

Other additives may also be incorporated with the fuel.

Such additives include antioxidants, metal deactivators, cetane improvers, pour point depressors and antismoke additives.

A number of imides were prepared following the described procedures using a variety of amines. These imides were tested under a variety of generally accepted tests which determine the acceptability of the composition as a fuel dispersant.

An accelerated stability test comprises heating a sample fuel for 90 minutes at 300° F., cooling at ambient temperatures for 90 minutes and then filtering through a Whatman No. 1 filter paper. The appearance of the deposits on the filter is rated by a reflectometer on a rating scale of 100% reflectance for a new white filter and 0% reflectance for a completely black filter.

A second stability test was carried out by heating the fuel for 20 hours at 200° F. The fuel was then cooled at ambient temperature for 24 hours and filtered through a tarred 5-micron pore size Millipore membrane filter. The filter is then weighed and the results are shown as percent deposits reduced. The value is calculated as follows:

$$100 - \left(\frac{\text{p.p.m. filter residue of compounded fuel}}{\text{p.p.m. filter residue of base fuel}}\right) \times 100$$

A third test is referred to as the Hot Nozzle Injector Test. The test uses a modified CFR diesel engine where the fuel injector system has the nozzle cooling restricted in order to increase the severity of the test. The injector deposits obtained in this test are rated with the aid of a reflectometer. The results are reported as percent deposits reduced.

The following Table II describes the various polymers and indicates the results obtained from the above tests. The polymers were all prepared using 30, 40, 30 mole percent respectively of $C_{9-11}:C_{11-15}:C_{15-20}$ (the compositions of the fractions having been described previously) and are all with one exception of about 200,000 molecular weight and of about 4500 equivalent weight per succinimide. The fuel used was a 70% FCC light cycle oil plus 30% vacuum top cut straight run. The fuel was prefiltered through a Millipore filter to remove any gums or deposits present just before using in the stability tests.

TABLE II

| Amine | 90 Minutes, 300° F., Percent Reflectance at 100 p.p.m.[1] | 20 Hrs., 200° F., Percent Deposit Reduced at 100 p.p.m.[1] | Hot Nozzle Injector Test, Percent Deposit Reduced at 200 p.p.m.[1] |
|---|---|---|---|
| 4. n-Heptyl | 51 | | |
| 5. n-Dodecyl | 66 | 90 | |
| 6. n-Hexadecyl | 64 | 90 | |
| 1. Cyclohexyl | 59 | 90 | 14 |
| 7. Octadecenyl | 68 | 92 | |
| 8. Octadecenyl-octadecadienyl | 64 | 92 | |
| 9. Allyl/cyclohexyl | 62 | 88 | |
| 2. Benzyl | 66 | 95 | |
| 3. Benzyl [2] | 69 | 89 | 13 |
| 10. 4-methylbenzyl | 66 | 90 | 38 |
| 11. α-Methylbenzyl | 67 | 92 | 8 |
| 12. 2-phenylethyl | 61 | 96 | |
| 13. 2,4-dimethylphenyl | 66 | 88 | |
| 14. 2,6-dimethylphenyl | 61 | 92 | |
| 15. 2,6-diethylphenyl | 69 | 88 | 13 |
| 16. p-Methoxyphenyl | 70 | 98 | |
| 17. N,N-dimethylaminophenyl | 67 | 92 | 8 |
|  | 66 | 87 | |

[1] Concentration of additive.
[2] Polymer was somewhat greater than 300,000 molecular weight.

The 2,4-dimethylphenyl imide described above was tested in several kerosene-type jet fuels in a modified standard ASTM-CRC Jet Fuel Coker Test. In addition to the imide additive, the fuels contained 8 p.p.m. of N,N'-disalicylidene-1,2-propanediamine, a commercially used metal deactivator. In carrying out this test, the equipment used in the Fuel Coker Test ASTM D 1660 is modified by a kit which consists of a new preheater assembly and separate fuel reservoir which has provision for heating. This kit modifies the standard coker to obtain results identical to those obtained on the high temperature research coker. The heated fuel reservoir in the modified coker stresses the fuel prior to testing in the preheater and filter of the coker. The flow rate in the modified coker is 2.5 lbs./hr. Table III lists the results obtained in this test comparing different samples of the base fuels (Jet A-1) containing no additives with the fuels containing the imide and metal deactivator.

TABLE III

| Conc. of Imide, p.p.m. | Temperature, °F. Preheater Fuel Out | Temperature, °F. Filter Case | Filter Pressure Drop, Inches Hg |
|---|---|---|---|
| 0 | 400 | 500 | 25 |
| 25 | 525 | 625 | 0 |
| 0 | 375 | 475 | 25 |
| 25 | 475 | 575 | 0 |
| 0 | 425 | 525 | 25 |
| 25 | 500 | 600 | 0 |
| 0 | 400 | 500 | 25 |
| 200 | 500 | 600 | 1.01 |
| 0 | 400 | 500 | 25 |
| 200 | 500 | 600 | 0 |

Repeating the modified ASTM Coker Test, as described above with the benzyl imide derivative (Example 2), using different samples of Jet A-1 fuels, the results obtained are reported in the following Table IV.

TABLE IV

| Benzyl Imide, p.p.m. | DMD,[1] p.p.m. | Test Conditions, °F. Preheater Temp. | Test Conditions, °F. Filter Temp. | Flow Rate, lbs./hr. | Filter Pressure Drop ΔP, Inches Hg | Filter Pressure Drop Test Time, Min. |
|---|---|---|---|---|---|---|
| | | 500 | 600 | 2.5 | 14.6 | 300 |
| 200 | 8 | 500 | 600 | 2.5 | 0 | 300 |
| | | 400 | 500 | 2.5 | 25 | 152 |
| 200 | 8 | 500 | 600 | 2.5 | 0 | 300 |

[1] DMD = N,N'-disalicylidene-1,2-propanediamine—metal deactivator.

The above results of the Coker Tests (Tables III and IV) demonstrate that the fuels containing the detergents of this invention are stable under the severe test conditions. That is, any gums which are formed under the test conditions remain dispersed in the fuel.

A further composition (Example 18) was prepared by copolymerizing as described in Example C in 20:20:60 weight percent, respectively, the $C_{9-11}$, $C_{10-15}$ and $C_{15-20}$ fractions, adducting maleic anhydride as described in Example B and then forming the benzyl imide as described in Example 2. The final product had a molecular weight of 100,000 and an equivalent weight of 5000.

This product was tested with a wide variety of fuels under the conditions of the two stability tests as described above, as well as a long-term storage test. The long-term storage test is carried out by aging the fuel for four weeks at 140° F. and then filtering through a tared 5μ Millipore membrane filter. The results are reported as the weight of residue in parts per million. Also reported in the table are the ASTM colors (ASTM D 1500) for the initial fuel and the fuel at the end of the test. The various fuels are designated according to fuel type and by number according to source.

TABLE V

| Fuel[1] | Additive Conc., p.p.m. | DMD[2] Conc., p.p.m. | Initial ASTM Color | 90 Min., 300° F., Percent Reflectance | 20 Hrs., 200° F. | | 4 Wks., 140° F. | |
|---|---|---|---|---|---|---|---|---|
| | | | | | Filter Residue, p.p.m. | ASTM Color | Filter Residue, p.p.m. | ASTM Color |
| A-1 | | | 1.5 | 75 | 2.3 | 2.5 | 3.0 | L3.0 |
| A-1 | 100 | | 1.5 | 90 | 0j.6 | 2.5 | 2.9 | L3.0 |
| B-1 | | | L2.0 | 91 | 1.1 | L3.0 | 5.7 | L4.5 |
| B-1 | 100 | | L2.0 | 93 | 1.7 | L3.0 | 3.7 | L4.5 |
| B-1 | 100 | 10 | L2.0 | 93 | 0.6 | L3.0 | 4.1 | L4.5 |
| A-2 | | | L0.5 | 89 | 41 | L2.0 | 15 | L1.5 |
| A-2 | 100 | | L0.5 | 97 | 9 | L2.5 | 6.1 | L1.5 |
| B-2 | | | L2.0 | 81 | 8.0 | L3.5 | 48 | 5.5 |
| B-2 | 100 | | L2.0 | 89 | 2.3 | 3.5 | 5.0 | L8.0 |
| B-2 | 100 | 10 | L2.0 | 90 | 1.9 | 3.0 | 4.9 | 5.0 |
| B-2 | | | 3.5 | 41 | 25 | 4.5 | 58 | L5.0 |
| B-2 | 100 | | 3.5 | 55 | 11 | L5.0 | 23 | L5.5 |
| B-2 | 100 | 10 | 3.5 | 63 | 11 | L5.0 | 19 | L5.5 |
| A-3 | | | L0.5 | 95 | 2.3 | 0.5 | 3.2 | L1.0 |
| A-3 | 100 | | L0.5 | 97 | 1.1 | L1.0 | 2.0 | L1.5 |
| B-3 | | | 3.0 | 84 | 13 | 5.5 | 43 | L7.0 |
| B-3 | 100 | | 3.0 | 90 | 4.6 | 5.5 | 8.4 | 7.5 |
| A-4 | | | L1.0 | 92 | 1.7 | L1.0 | 3.6 | L1.5 |
| A-4 | 100 | | L1.0 | 94 | 1.1 | L1.0 | 2.9 | L1.5 |
| A-4 | | | 0.5 | 70 | 25 | L3.0 | 15 | L2.5 |
| A-4 | 100 | | 0.5 | 84 | 4.0 | L2.5 | 10 | L2.5 |
| C-1 | | | 1.5 | 89 | 6.9 | 4.0 | 54 | 5.5 |
| C-1 | 100 | | 1.5 | 89 | 1.7 | 4.0 | 5.3 | L7.5 |
| A-5 | | | L2.0 | 53 | 8.0 | 4.0 | 11.0 | L4.5 |
| A-5 | 100 | | L2.0 | 83 | 1.1 | 4.0 | 1.4 | L4.5 |
| B-4 | | | 2.5 | 87 | 2.9 | 3.5 | 15 | 5.0 |
| B-4 | 100 | | 2.5 | 91 | 0.6 | 3.5 | 3.7 | 5.0 |
| B-4 | 100 | 10 | 2.5 | 92 | 1.1 | 3.0 | 3.5 | 5.0 |

[1] A=Straight run distillate; B=Approximately 1=1 mixture of straight run distillate and cracked distillate; C=FCC Light Cycle Oil. The different numbers indicate different refinery sources.
[2] DMD=N,N'-disalicylidene-1,2-propylenediamine—metal deactivator.

In order to determine the effectiveness of the detergent in an engine, 100 p.p.m. of the additive prepared in Example 18 was used in a test fuel comprising a blend of 70% FCC Light Cycle Oil and 30% vacuum top cut straight run for 200 hours in a laboratory GM 1-71 2-stroke cycle diesel engine under high load conditions. Little difference was found in piston deposits between the base and additive fuels, indicating that the additives are stable and compatible diesel fuel additives. However, there was significant difference between the pressed wire filters and between the injector plungers in the runs carried out with and without the additive. Significant reduction in deposits was evident when the additive was used. Moreover, extracting the fuel filters with solvents, distilling off the solvent and weighing the residue showed a residue of 27 g. with the base fuel and 6.5 g. with the base fuel containing the additive.

Further demonstration of the effectiveness of the additives of this invention was demonstrated with the Cummins Engine Test using the additive prepared in Example 2. Two high-load, 160-hour tests were carried out in an NH-220 Cummins Diesel Engine on base fuel (70% catalytic cracked light cycle oil plus 30% vacuum top cut straight run) and base fuel compounded with 100 p.p.m. of the additives of Example 2. The deposits were extracted from the filters with a mixture of solvents and a soxhlet extractor. The solvents were removed in vacuo and the resulting deposits weighed. Also noted by visual inspection was the state of the plungers and cup, as well as the effect on smoke. The following Table VI indicates the results obtained.

TABLE VI

| Ex. 2 Conc., p.p.m. | Injector Condition | Smoke, Percent | | Filter Deposits, Grams |
|---|---|---|---|---|
| | | Start of Test | End of Test | |
| 100 | Light Deposits | 6.5 | 9 | 2 |
| | Heavy Deposits | 10 | (¹) | 32 |

[1] Above 60.

Exhaust smoke measurements included in the above table show that during the base fuel run the smoke gradually increased from 10% to above 60%, while the additive fuel test started at 6.5% and varied between 6.5-9% during the entire test. These smoke data confirm the excellent performance of the additive as an injector detergent.

It is evident from the above data that the compositions of this invention stabilize a wide variety of fuel oils for long periods of time under severe conditions. Moreover, the compositions are compatible as fuel additives and do not increase the deposits in the engine nor interfere with the functioning of the engine, while significantly reducing the deposits in the filters and nozzles. The color of the fuels important for commercial acceptance and pipeline transportation, is maintained at an acceptable level under severe testing conditions.

While not essential to the satisfactory operation of the fuel additive, it is preferable that the dispersants do not enhance the emulsibility of water with the fuel. To this extent the benzyl derivatives are preferred because they provide excellent dispersancy in sludge control, while not increasing significantly the emulsibility of oil. That is, upon mixing the fuel with water, the water and fuel rapidly separate into two distinct phases.

As will be evident to those skilled in the art, various modifications on this invention can be made or followed, in the light of the foregoing disclosure and discussion.

We claim:

1. As a composition of matter, a polymer having a molecular weight in the range of $1 \times 10^5$ to $1 \times 10^6$ and having as its recurring unit a group of the formula

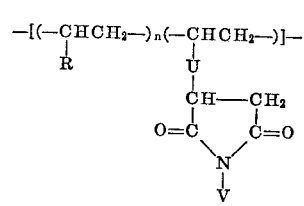

wherein $n$ is an integer of from 10 to 100, R is an alkyl radical of from 4 to 18 carbon atoms, V is of not more than 22 carbon atoms and free of other than carbon and hydrogen, and U is alkenylene of from 4 to 18 carbon atoms.

2. A composition according to claim 1, wherein $n$ is an integer of from 15 to 80.

3. As a composition of matter, a polymer having a molecular weight in the range of $1 \times 10^5$ to $1 \times 10^6$ and having as its recurring unit a group of the formula

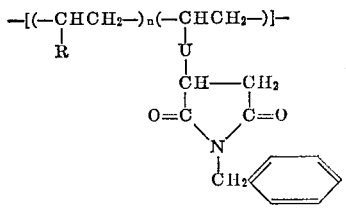

wherein $n$ is an integer of from 10 to 100, R is an alkyl radical of from 6 to 18 carbon atoms, and U is alkenylene of from 4 to 18 carbon atoms.

4. As a composition of matter, a polymer having a molecular weight in the range of $1 \times 10^5$ to $1 \times 10^6$ and having as its recurring unit a group of the formula

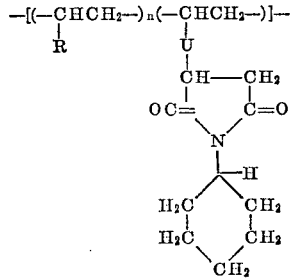

wherein $n$ is an integer of from 10 to 100, R is an alkyl radical of from 6 to 18 carbon atoms, and U is alkenylene of from 4 to 18 carbon atoms.

5. As a composition of matter, a polymer having a molecular weight in the range of $1 \times 10^5$ to $1 \times 10^6$ and having as its recurring unit a group of the formula

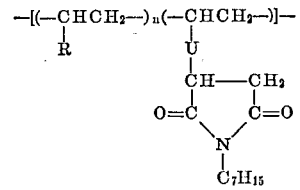

wherein $n$ is an integer of from 10 to 100, R is an alkyl radical of from 6 to 18 carbon atoms, and U is alkenylene of from 4 to 18 carbon atoms.

6. As a composition of matter, a polymer having a molecular weight in the range of 100,000 to 1,000,000 and having as its recurring unit a group of the formula

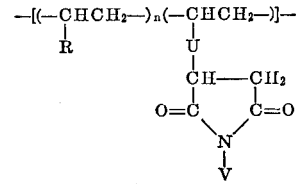

wherein $n$ is an integer in the range of 10 to 100, R is an alkyl group of from 4 to 20 carbon atoms, U is an alkenylene radical of from 4 to 18 carbon atoms, and V is of from 7 to 22 carbon atoms and is selected from the group consisting of di(lower alkyl)amino and lower alkoxy aryl, alkaryl and aralkyl groups.

No references cited.

ALEX MAZEL, *Primary Examiner.*

JOSE TOVAR, *Assistant Examiner.*

U.S. Cl. X.R.

44—62; 260—326.5